Aug. 2, 1949.  C. S. MILNE  2,477,888
WIND DEFLECTING WING FOR WINDOW OPENINGS
Filed May 27, 1946
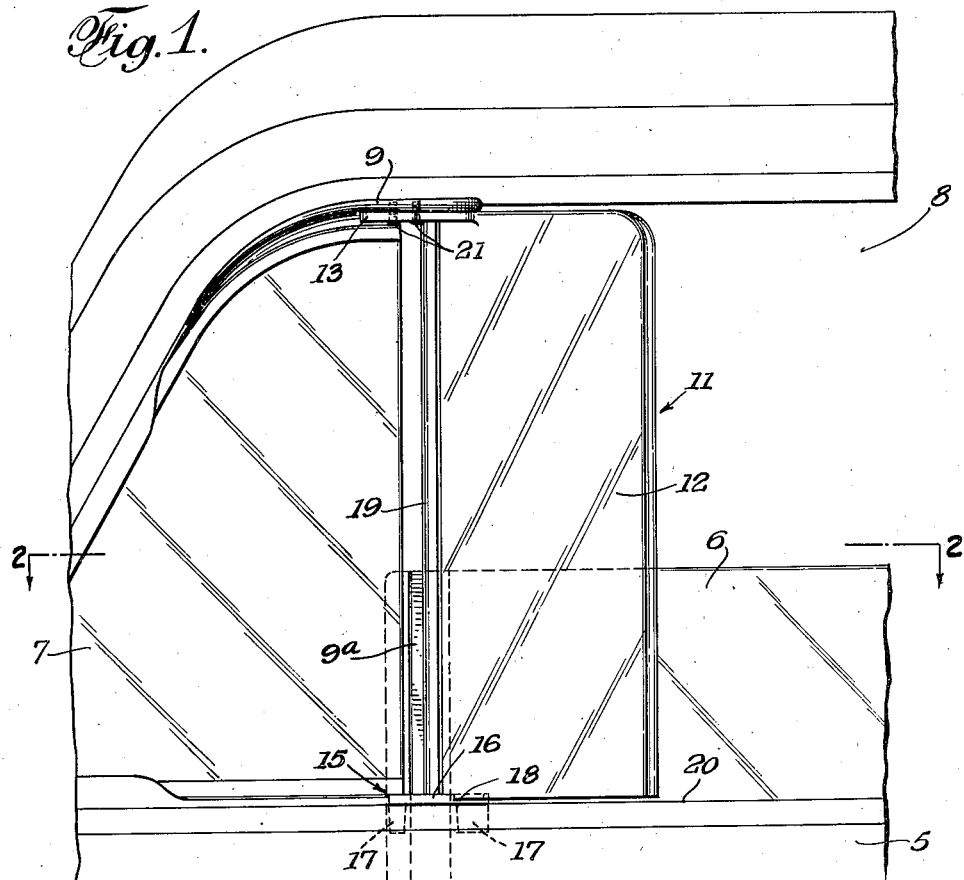
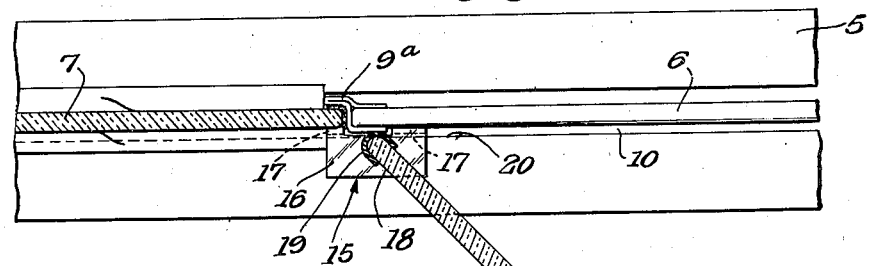
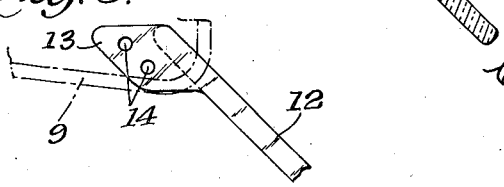
INVENTOR.
Claude S. Milne
BY C. G. Stratton
ATTORNEY Patented Aug. 2, 1949

2,477,888

UNITED STATES PATENT OFFICE 2,477,888

WIND DEFLECTING WING FOR WINDOW OPENINGS

Claude S. Milne, Los Angeles, Calif.; Verna Marjorie Milne executrix of said Claude S. Milne, deceased Application May 27, 1946, Serial No. 672,408

4 Claims. (Cl. 296—44)

This invention relates to wind deflectors for vehicles and deals more particularly with a wind deflecting wing for the front side window of an automobile.

An object of the present invention is to provide a wind deflecting wing which is fixed at an angular position to serve as a wind deflector when the window opening is open and thereby shield the interior of a vehicle and yet not interfere with the signaling movements of the arm of the driver of said vehicle.

Another object of the invention is to provide a wind deflecting wing adapted to be applied to existing side windows of automobiles to supplement the roll-down window and hinged wind wing thereof, which is independent of the movement of the latter, and which serves as a windshield for the interior of the automobile.

Another object of the invention is to provide a readily installable transparent wind shielding wing which is adapted, by merely varying its length dimension, to be fitted into place in various automotive vehicles.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a fragmentary side view of the front side window area of an automobile showing a preferred embodiment of the invention in operative position.

Fig. 2 is a plan sectional view as taken on the line 2—2 of Fig. 1.

Fig. 3 is a fragmentary detail plan view of the wing embodying the invention.

In a conventional automobile, each side door 5 is provided with a vertically movable window 6 and a pivotal wind wing 7 serving to close the window opening 8. Such structures, typically, include a water drip catching member 9. The window 6 usually is provided with a rail 9a at its forward edge against which the wind wing 7 seals when closed. The window together with its rail is movable into and out of a well 10 formed in the door. In use, the window can be raised or lowered as desired and the wind wing 7 swung on its pivot. The wind wing, however, has many positions, some of which, while affording a windshield for the front compartment of the auto, do not suitably shield the back compartment when the window 6 is down. Accordingly, the invention provides a wing 11 so mounted in the window opening as to shield said back compartment as indicated above.

The wing 11 comprises a preferably transparent plastic sheet or vane 12 of generally rectangular shape and provided with an integral horizontal ear or lug 13 at one upper corner thereof. Said lug is provided with screw openings 14 passing vertically therethrough. At its bottom, the wing is provided with a bracket 15 formed with a horizontal portion 16 and with spaced vertical leg portions 17 so spaced that said legs straddle the rail 9a of the window and are adapted to enter the well 10. The portion 16 is preferably slotted at an angle at 18 to receive the lower edge of the sheet or vane 12. A sealing strip 19 may be provided between the adjacent edge of the vane 12 and the rail 9a. Said strip may be applied as shown or extend from a rabbet or groove in said edge of the vane.

The vane 12 is supplied of such length that it will span the largest window opening of automobiles. Upon installation, the vane is first cut to proper length, the bracket 15 is hooked over the ledge 20 of the window with the legs 17 in the well 10 and straddling the rail 9a, and the portion 16 resting on said ledge. The bottom of the vane is then set into the slot 18 and secured therein either by cement, fastening screw or both and the lug 13 is applied to the under surface of the drip catcher 9. By drilling and tapping holes in said drip catcher in alignment with the holes 14, screws 21 may be applied to secure the wing in place. It will be seen that the vane is disposed at such an angle as to serve as a wind deflector, that both the window 6 and wind wing 7 can be operated in their normal manner, and that hand signaling can be effected through the window opening without interference by the wing 11. The rail 9a serves to locate the bracket 15 and thereby serves to hold the wing stationary at all times.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described by invention, what I claim and desire to secure by Letters Patent is:

1. A fixed wind wing for the side door of a vehicle, said door having a window opening, a sliding window for closing said opening and housed in a well formed in the door, a vertical rail defining the front edge of said window, said door further having a swingable wing forward of said rail and a drip catcher extending outward of the door from the top of the window opening; said fixed wind wing comprising a vertical angularly disposed transparent vane having an integral outwardly extending lug, means connecting said lug and drip catcher, said vane extending between the drip catcher and the bottom of the window opening, and a bracket having a slot in which the lower end of said vane is engaged, said bracket having spaced lugs one on each side of the mentioned rail and said lugs being disposed within the window well.

2. A wind deflecting wing for the window opening of a side door of a vehicle, said door having a sliding window controlling said opening and a well for receiving said sliding window, there being a fixed rail extending vertically in said opening at the front edge of the sliding window, said wind deflecting wing comprising a vertical angularly disposed transparent vane, an integral securing lug at the upper end of the vane and a bracket secured to the lower end of said vane and adapted to hook into the well of said door, said bracket comprising a member having spaced legs disposed within the well and straddling the mentioned vertical rail and having a horizontal portion resting on the edge of the door that defines the bottom of the window opening.

3. A wind deflecting wing for the window opening of a side door of a vehicle, said door having a sliding window controlling said opening and a well for receiving said sliding window, there being a fixed rail extending vertically in said opening at the front edge of the sliding window, said wind deflecting wing comprising a vertical angularly disposed transparent vane, an integral securing lug at the upper end of the vane and a bracket secured to the lower end of said vane and adapted to hook into the well of said door, said bracket comprising a member having spaced legs disposed within the well and straddling the mentioned vertical rail and having a horizontal portion resting on the edge of the door that defines the bottom of the window opening, the upper surface of said horizontal portion being slotted to receive the lower end of the vane.

4. A wind deflecting wing for the window opening of a side door of a vehicle, said door having an outwardly extending drip catcher at the upper end of said opening and having a sliding window controlling said opening and a well extending downward from said opening for receiving said sliding window, there being a fixed rail extending vertically in said opening in vertical alignment with the drip catcher and at the front edge of the sliding window, said wind deflecting wing comprising a vertical angularly outwardly directed transparent vane having one side edge immediately adjacent to said fixed rail and extending between the drip catcher and the well in the door, an integral lug on the vane and secured to the drip catcher, and a bracket secured to the vane, said bracket comprising a member having spaced legs disposed within the well and straddling the mentioned vertical rail and having a horizontal portion resting on the edge of the door that defines the bottom of the window opening.

CLAUDE S. MILNE.

REFERENCES CITED

The following references are of record in the file of this patent:

UNITED STATES PATENTS

| Number | Name | Date |
| --- | --- | --- |
| 1,948,642 | Beisel | Feb. 27, 1934 |
| 1,995,415 | Callahan | Mar. 26, 1935 |
| 2,002,736 | Grotenhuis | May 28, 1935 |
| 2,128,951 | Lillie | Sept. 6, 1938 |
| 2,236,615 | Wheeler | Apr. 1, 1941 |
| 2,281,840 | Hamilton | May 5, 1942 |